3,390,171
METHOD OF REMOVING POTASSIUM IONS FROM HYDROXYALKYL ALKYL MALEATES

George L. Brownell, Mount Lebanon Township, Allegheny County, Pa., assignor to United States Steel Corporation, a corporation of Delaware
No Drawing. Filed May 6, 1966, Ser. No. 548,074
4 Claims. (Cl. 260—485)

This invention relates to an improved method of removing potassium ions from hydroxyalkyl alkyl maleates.

Hydroxylalkyl alkyl maleates are monomers which copolymerize with vinyl monomers, such as styrene, acrylates, methacrylates or vinyl acetate, to produce a copolymer with a pendant reactive hydroxyl group. When this copolymer is heated with a thermosetting resin, such as melamine-formaldehyde or urea-formaldehyde, the hydroxyl group is crosslinked to the thermoset resin. The resulting product is useful as a protective coating.

Hydroxyalkyl alkyl maleates have the structural formula:

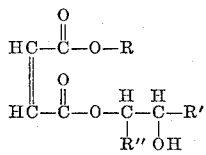

R may be an alkyl group ranging from methyl to decyl or even higher; both R' and and R" may be hydrogen, or one but not both may be a methyl group. These compounds can be prepared by adding alkylene oxides to monoalkyl maleates in the presense of a catalyst. Commonly an excess of the alkylene oxide is added slowly to the monoalkyl maleate, and the mixture heated for about four hours at a temperature of about 70° C. The operation can be conducted under pressure if the alkylene oxide is one which vaporizes at atmospheric pressure. Subsequently the resulting hydroxyalkyl alkyl maleate is stripped of excess alkylene oxide under vacuum. Perhaps the most widely used compound of this class is hydroxypropyl butyl maleate (hereinafter referred to as "HPBM") which may be prepared with propylene oxide and monobutyl maleate. Other examples of such compounds are hydroxyethyl butyl maleate, hydroxypropyl octyl maleate, hydroxyethyl octyl maleate, hydroxypropyl methyl maleate, etc.

The best catalyst I know of for preparing hydroxyalkyl alkyl maleates is potassium hydroxide, which may be used in quantities of about 0.5 percent based on the weight of monoalkyl maleate. However, the resulting compound retains an undesirably high concentration of potassium ions (about 2600 parts per million). When the compound stands for a period at room temperature or is heat-aged, a high concentration of potassium ions causes a sediment to form (presumably a potassium maleate salt). Potassium ions also catalyze the formation of small amounts of bis maleate, which causes gelling of the product when copolymerization with a vinyl monomer is attempted. A gelled copolymer is useless. It has been difficult to remove potassium ions to the extent necessary to prevent this formation of bis maleate. Washing with water is impractical because water is highly soluble in hydroxyalkyl alkyl maleates and the latter likewise are highly soluble in water. Conventional ion exchange resins (either strong acid or weak acid types) are ineffective. In either column or batch treatment they lower the potassium ion content only to about 1600 p.p.m., which is still too high.

The most successful previous method of lowering the potassium ion concentration in hydroxyalkyl alkyl maleates of which I am aware has been to treat the maleate with a solid, substantially insoluble acid, such as silicic acid or terephthalic acid. This method forms the subject of a copending application, Davie, Ser. No. 490,101, filed Sept. 24, 1965, of common ownership to the present application. Although the method is effective, it necessitates the use of relatively large quantities of the acid, and afterward of large filter presses to remove the acid particles from the product. To minimize product loss, the filter cake should be flushed with a solvent, and the product recovered from the solvent. These operations add substantially to manufacturing costs.

An object of the present invention is to provide an improved effective method of lowering the concentration of potassium ions in hydroxyalkyl alkyl maleates and avoiding costly operations required in the foregoing method.

A further object is to provide an improved method of accomplishing the foregoing object wherein the maleate is treated with inexpensive phosphoric acid, which removes potassium ions but leaves a much smaller volume of precipitate to be removed in filtering.

According to my invention, I prepare a hydroxyalkyl alkyl maleate, such as HPBM, in the usual way already described. The resulting compound contains about 2600 p.p.m. of potassium ions. I add orthophosphoric acid to this maleate, preferably in concentrated form (85% $H_3PO_4$). I use sufficient acid to provide a ratio of 1 mole $H_3PO_4$ to each mole of potassium ions in the maleate. Preferably I use exactly a 1 to 1 mole ratio, but I can add a larger quantity of acid, up to about a 2 to 1 mole ratio of $H_3PO_4$ to potassium ions. I heat the mixture of maleate and acid to a temperature of 50 to 80 °C. or preferably 55 to 60° C. for at least about 30 minutes, but not longer than about 1 hour. The treatment must not be too prolonged or at too high a temperature, or bis maleate may form. I then cool and filter the product, preferably first adding up to about 1 percent by weight of diatomaceous earth as a filtering aid. The potassium ions precipitate as potassium dihydrogen phosphate, which I separate from the maleate in the filtering step. Properly conducted, my method removes the entire content of potassium ion. As far as I am aware, any small excess of phosphoric acid which remains in the product is not objectionable.

EXAMPLE I

As a specific example to demonstrate how my invention operates, I added 3.40 grams of 85 percent $H_3PO_4$ to 250 grams of HPBM, which had an initial potassium ion concentration of 2325 p.p.m. I heated the mixture to a temperature of 55 to 58° C. for 30 minutes, added 2.5 grams of diatomaceous earth filtering aid, and held it at a temperature of 55 to 58° C. for another 30 minutes. Next I cooled the mixture to room temperature and filtered it. The resulting product had a potassium ion concentration of 5.2 p.p.m. In this example I used a mole ratio of $H_3PO_4$ to potassium ion of approximately 2 to 1. The initial acid number of the maleate was 0.98, and of the final product 11.2.

EXAMPLE II

I added 1.70 grams of 85 percent $H_3PO_4$ to a similar sample of HPBM and treated the mixture as in the foregoing example. The potassium ion concentration of the final product was nil. The mole ratio of $H_3PO_4$ to potassium ion in this example was about 1 to 1, and the final acid number 5.

From the foregoing description and examples, it is seen that my invention affords a simple highly effective method of lowering the potassium ion content of hydroxyalkyl alkyl maleates, such as HPBM. My results show an even lower concentration of potassium ions in the final product than the results reported in the aforementioned Davie application. In practicing my invention, I introduce no solid acid particles to be removed in the filtering step. There is only the relatively small volume of precipitated potassium dihydrogen phosphate along with the filtering aid.

While I have described only certain preferred ways of practicing my invention, it is apparent other modifications may arise. Therefore I do not wish to be limited by the disclosure set forth, but only by the scope of the appended claims.

I claim:

1. A method of removing potassium ions from hydroxyalkyl alkyl maleates prepared by adding an alkylene oxide to a monoalkyl maleate in the presence of potassium hydroxide as a catalyst, said method comprising treating the hydroxyalkyl alkyl maleate with otrhophosphoric acid in an amount to furnish a mole ratio of acid to potassium ions of at least 1 to 1 up to a maximum of 2 to 1, heating the maleate and acid mixture to a temperature of 50 to 80° C. for a period of at least about 30 minutes to about 1 hour, and cooling and filtering the mixture.

2. A method as defined in claim 1 in which the acid is about 85 percent $H_3PO_4$.

3. A method as defined in claim 1 in which the maleate is hydroxypropyl butyl maleate.

4. A method as defined in claim 1 further comprising adding about 1 percent by weight of diatomaceous earth filtering aid to the mixture before filtering.

References Cited

UNITED STATES PATENTS 2,498,371   2/1950   Kloetzel _____ 260—485

LORRAINE A. WEINBERGER, *Primary Examiner.*

T. L. GALLOWAY, *Assistant Examiner.*